United States Patent
Miyawaki et al.

(10) Patent No.: US 8,956,744 B2
(45) Date of Patent: Feb. 17, 2015

(54) BATTERY ASSEMBLY AND ELECTRIC CELL

(75) Inventors: Yasutaka Miyawaki, Kyoto (JP); Yoshinori Ishimoto, Kyoto (JP); Atsushi Nishida, Kyoto (JP); Hirokazu Ito, Kyoto (JP)

(73) Assignee: GS Yuasa International Ltd., Kyoto-shi, Kyoto (JP)

(*) Notice: Subject to any disclaimer, the term of this patent is extended or adjusted under 35 U.S.C. 154(b) by 20 days.

(21) Appl. No.: 13/431,895

(22) Filed: Mar. 27, 2012

(65) Prior Publication Data

US 2012/0251855 A1 Oct. 4, 2012

(30) Foreign Application Priority Data

Mar. 28, 2011 (JP) ................................. 2011-070553

(51) Int. Cl.
| | |
|---|---|
| *H01M 2/04* | (2006.01) |
| *H01M 2/30* | (2006.01) |
| *H01M 2/10* | (2006.01) |
| *H01M 2/20* | (2006.01) |

(52) U.S. Cl.
CPC ............ *H01M 2/1077* (2013.01); *H01M 2/206* (2013.01)
USPC ......................................................... 429/65

(58) Field of Classification Search
USPC ......................................................... 429/65
See application file for complete search history.

(56) References Cited

U.S. PATENT DOCUMENTS

| | | | | |
|---|---|---|---|---|
| 7,341,479 | B2* | 3/2008 | Boutin | 439/521 |
| 7,367,847 | B2* | 5/2008 | Gutman et al. | 439/656 |
| 2003/0048091 | A1 | 3/2003 | Sato et al. | |
| 2009/0186260 | A1* | 7/2009 | Wiepen | 429/53 |

FOREIGN PATENT DOCUMENTS

| | | | |
|---|---|---|---|
| JP | 4-38664 U | | 3/1992 |
| JP | 08-050888 A | | 2/1996 |
| JP | H08-050888 | * | 2/1996 |
| JP | 11-086831 | * | 3/1999 |
| JP | 11-086831 A | | 3/1999 |
| JP | 2003-086219 A | | 3/2003 |
| JP | 2003-157828 A | | 5/2003 |
| JP | 2007-012485 A | | 1/2007 |
| JP | 2009-266614 A | | 11/2009 |

* cited by examiner

*Primary Examiner* — Patrick Ryan
*Assistant Examiner* — Christopher Domone
(74) *Attorney, Agent, or Firm* — McGinn IP Law Group, PLLC

(57) ABSTRACT

Each of electric cells constituting a battery assembly is provided with external terminals. The upper end of the electric cell is covered with an upper cap surrounding the external terminals whereas the lower end of the electric cell is covered with a lower cap. The electric cell is held between an upper holder and a lower holder via the upper cap and the lower cap. A plurality of bus bar openings for allowing a bus bar extending from the external terminals to be inserted therethrough are formed in the upper cap in such a manner as to penetrate in a thickness direction. Thus, it is possible to increase the degree of freedom of the arrangement of the electric cells in the battery assembly.

20 Claims, 14 Drawing Sheets

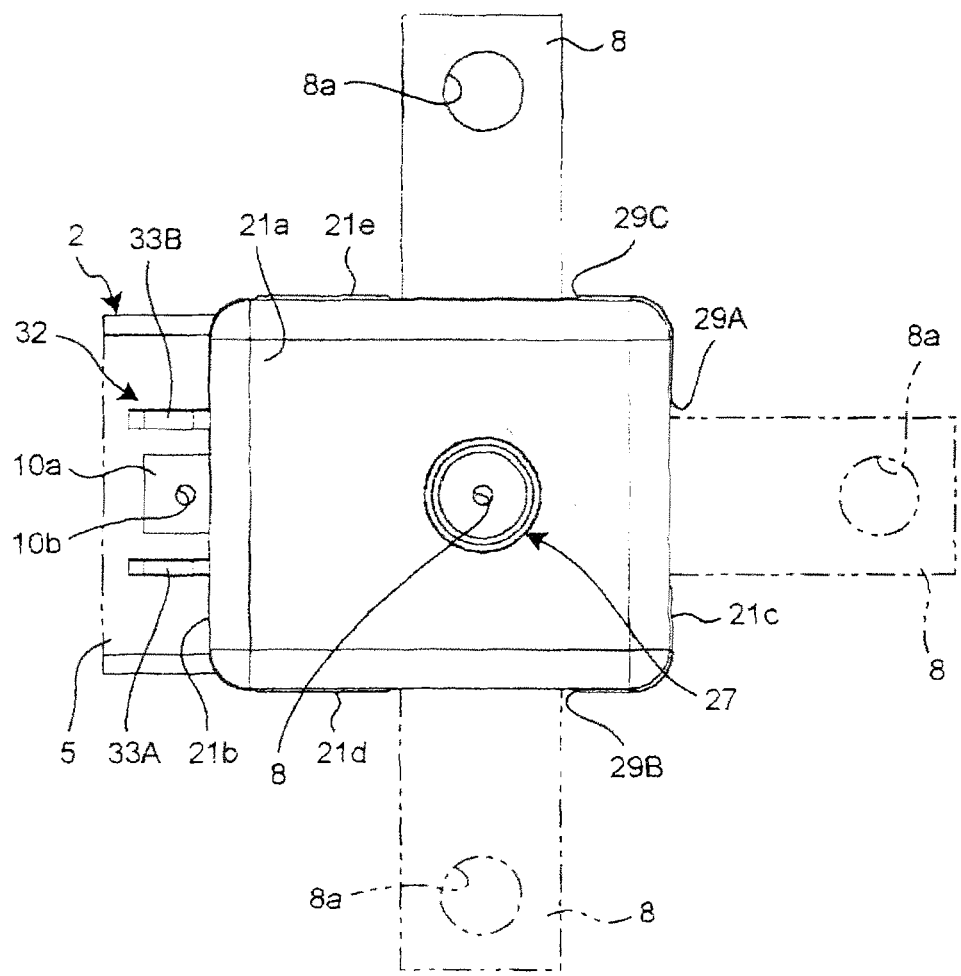

BATTERY ASSEMBLY AND ELECTRIC CELL

CROSS-REFERENCE TO RELATED APPLICATIONS

This application claims priority from Japanese Patent Application No. 2011-70553, the disclosure of which is incorporated herein by reference in their entireties.

BACKGROUND OF THE INVENTION

1. Field of the Invention

The present invention relates to a battery assembly (i.e., a battery module), in which a plurality of electric cells are electrically connected in the form of a module, and an electric cell.

2. Description of the Related Art

An external terminal of one of electric cells constituting a battery assembly is electrically connected to an external terminal of another electric cell disposed adjacently via a conductive member such as a bus bar. Some of combined batteries include a member (i.e., a cover or a case) covering the external terminal of the electric cell (see, for example, Japanese Unexamined Patent Publication Nos. 2003-86219 and 2009-266614).

When the arrangement of the plurality of electric cells constituting the battery assembly is changed, it may be possibly necessary to change the orientation of the conductive member connected to the external terminal. However, the conventional member (i.e., the cover or the case) covering the external terminal takes no special consideration of the change of the orientation of the conductive member, and therefore, it may be necessary to redesign the cover or the case accordingly when the orientation of the conductive member is changed. In this regard, the arrangement of the electric cells is limited in the conventional battery assembly provided with the member (i.e., the cover or the case) covering the external terminal of the electric cell.

SUMMARY OF THE INVENTION

An object of the present invention is to increase the degree of freedom of the arrangement of electric cells in a battery assembly.

According to a first aspect of the invention, a battery assembly includes: a plurality of electric cells, each having external terminals at one end thereof; and a cap disposed at the end of each of the electric cells, the cap including walls surrounding the external terminal; and a plurality of openings penetrating the walls in a thickness direction.

According to a second aspect of the invention, the battery assembly further includes a conductive member to be connected at one end thereof to the external terminal for the electric cell whereas at the other end thereof to the other electric cell, the conductive member being inserted into the opening.

According to a third aspect of the invention, it is preferable that the plurality of openings should be opened in directions different from each other.

According to a fourth aspect of the invention, the plurality of openings may be spaced at 90°, as viewed from the external terminal.

According to a fifth aspect of the invention, the plurality of openings are formed on the walls of the cap surrounding the external terminal. Thus, the orientation of the conductive member for electrically connecting the external terminal to an external terminal of an adjacent electric cell can be varied by determining which of the plurality of openings the conductive member is inserted into. In other words, as for one cap, the conductive member can extend from the external terminal in various directions (whose number corresponds to that of openings). Consequently, it is unnecessary to prepare a plurality of kinds of caps according to the direction in which the conductive member extends from the external terminal. Even when the direction of the conductive member is varied according to the variation of the arrangement of the plurality of electric cells constituting the battery assembly, there is no need to redesign the cap. In this point, the present invention can provide the high degree of freedom of the arrangement of the electric cells in the battery assembly.

According to an eighth aspect of the invention, the electric cell is formed into a substantially rectangular shape, the electric cell having a top surface formed into a rectangular shape, as viewed on a plane, having long sides and short sides, both end surfaces extending from pieces at both ends of the long sides of the top surface in a substantially orthogonal direction, and both side surfaces extending from both ends of the short sides of the top surface in a substantially orthogonal direction; and the cap has a top wall formed into a substantially rectangular shape, as viewed on a plane, in parallel to the top surface, a first end wall extending along one of the end surfaces from the top wall, a second end wall extending toward the top surface, and first and second side walls extending along both side surfaces.

According to a ninth aspect of the invention, the openings in the cap may be formed on the first end wall and the first and second side walls.

According to a tenth aspect of the invention, it is preferable that the battery assembly should further include a holder that is disposed at one of the ends of each of the plurality of electric cells and abuts against the cap.

According to an eleventh aspect of the invention, an electric cell includes: an package; an external terminal disposed at one end of the package; and a cap disposed at the end, the cap including walls surrounding the external terminal; and a plurality of openings penetrating the walls in a thickness direction.

According to a twelfth aspect of the embodiment, the electric cell further includes a conductive member to be connected at one end thereof to the external terminal, the other end of the conductive member extending outward of the cap via the opening.

BRIEF DESCRIPTION OF THE DRAWINGS

FIG. 10 is a plan view of the upper cap disposed in the electric cell;

DETAILED DESCRIPTION OF THE PREFERRED EMBODIMENTS

A detailed description will be given below of preferred embodiments according to the present invention with reference to the attached drawings.

First Preferred Embodiment

FIGS. 1 to 4 show a battery assembly (i.e., a battery module) 1 in a first preferred embodiment according to the present invention. The battery assembly 1 includes seven square electric cells (i.e., a battery cell) 2 that are non-aqueous electrolytic secondary batteries.

Figure 5:
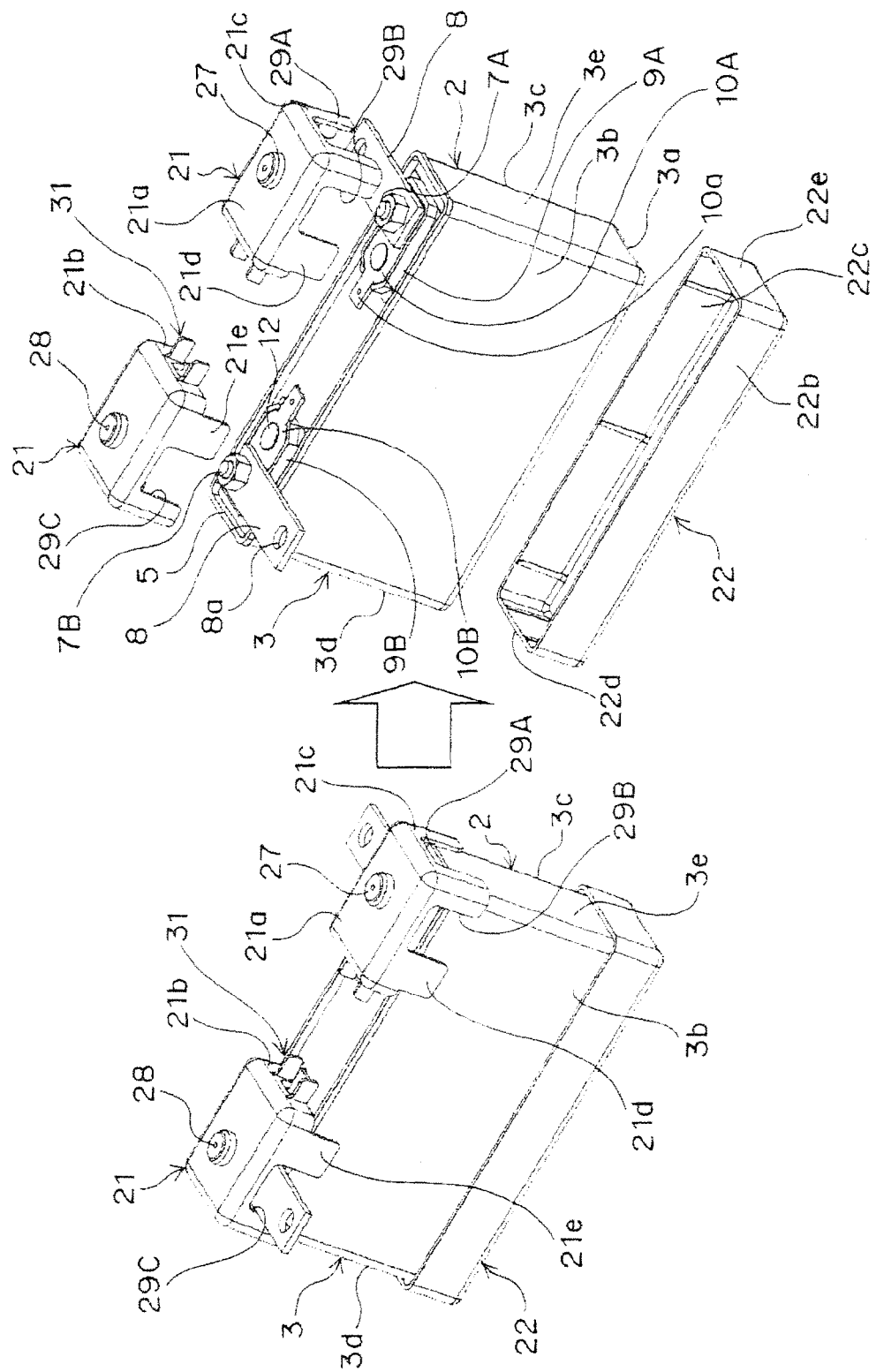
FIG. 5 is a perspective view of the electric cell, an upper cap, and a lower cap.
Figure 6:
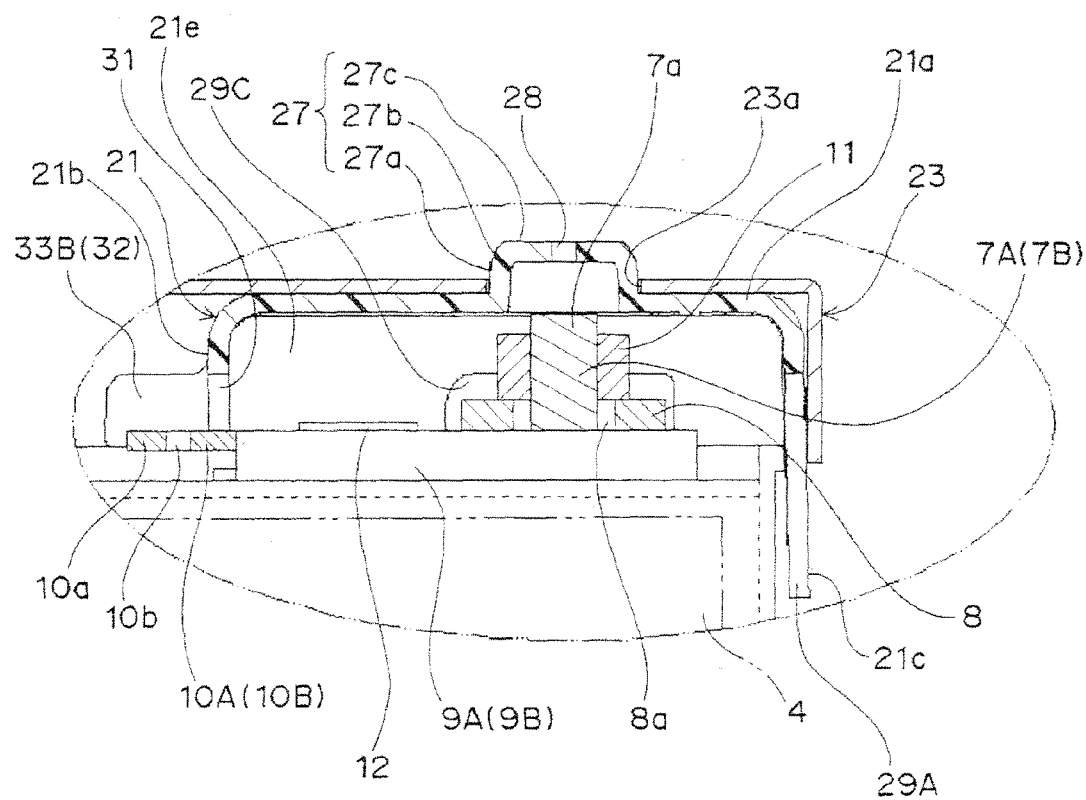
FIG. 6 is an enlarged cross-sectional view of the upper cap disposed in the electric cell.
Figure 7:
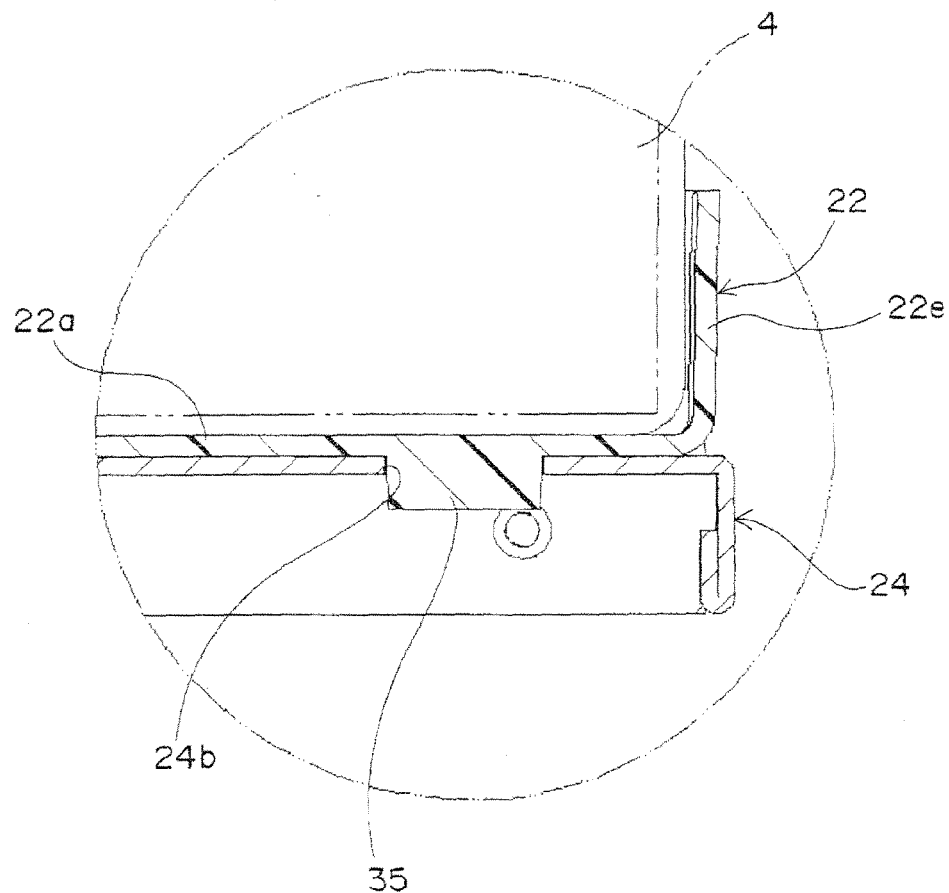
FIG. 7 is an enlarged cross-sectional view of the lower cap disposed in the electric cell.
Figure 8A:
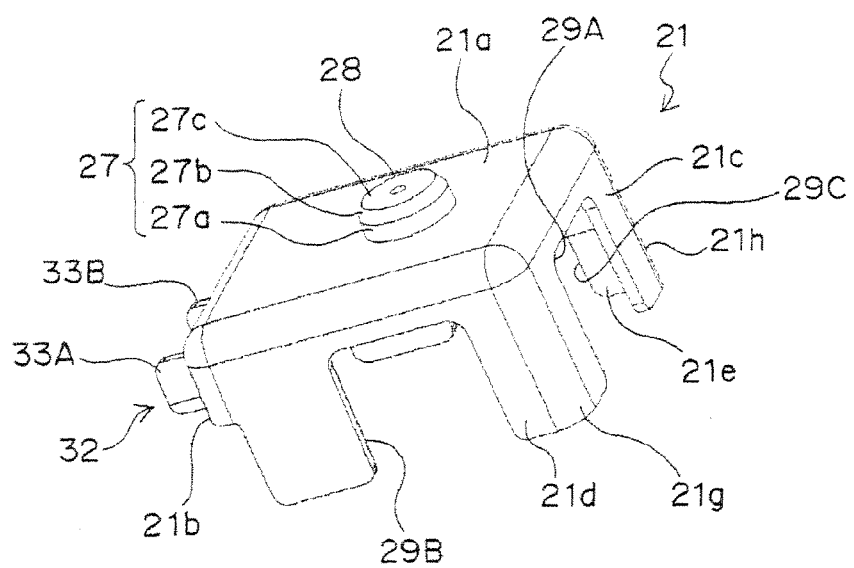
FIG. 8A is a perspective view of the upper cap, as viewed from above.
Figure 8B:
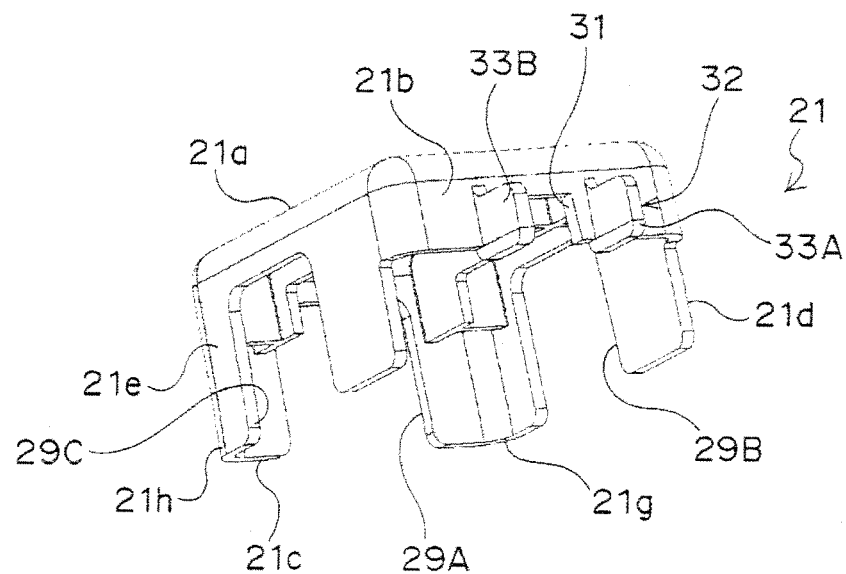
FIG. 8B is a perspective view of the upper cap, as viewed from above at an angle different from that of FIG. 8A.
Figure 8C:
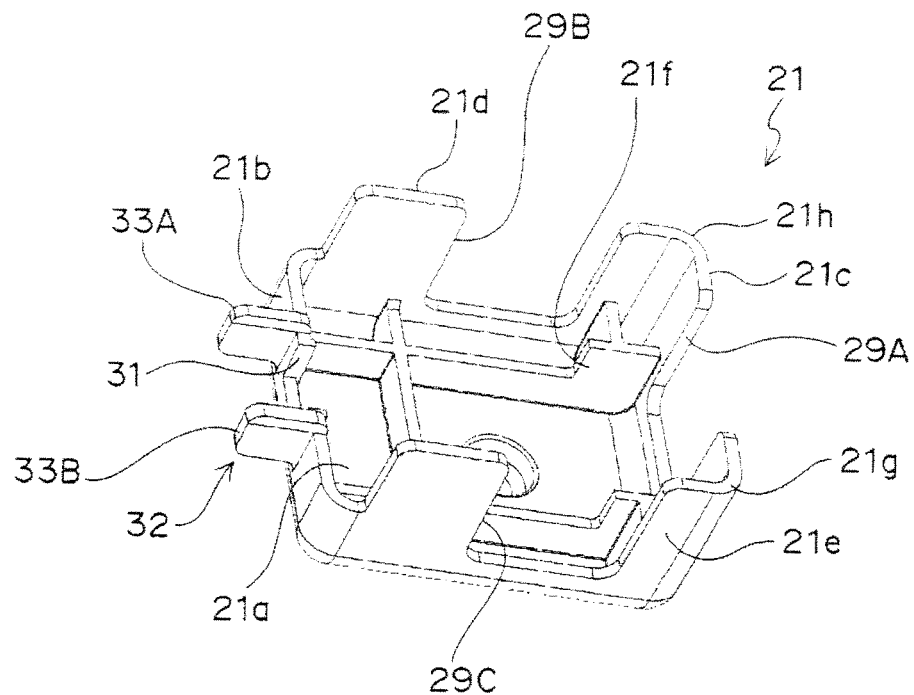
FIG. 8C is a perspective view of the upper cap, as viewed from below.
Figure 9A:
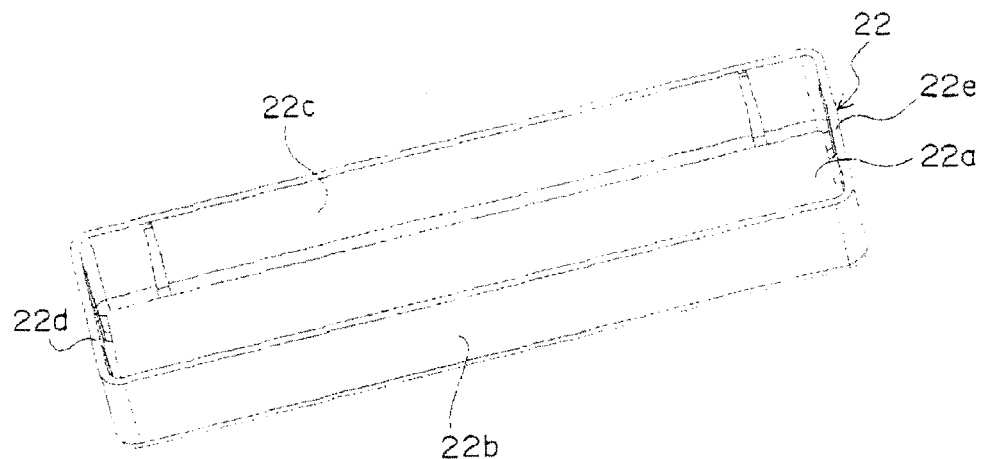
FIG. 9A is a perspective view of the lower cap, as viewed from above.
Figure 9B:
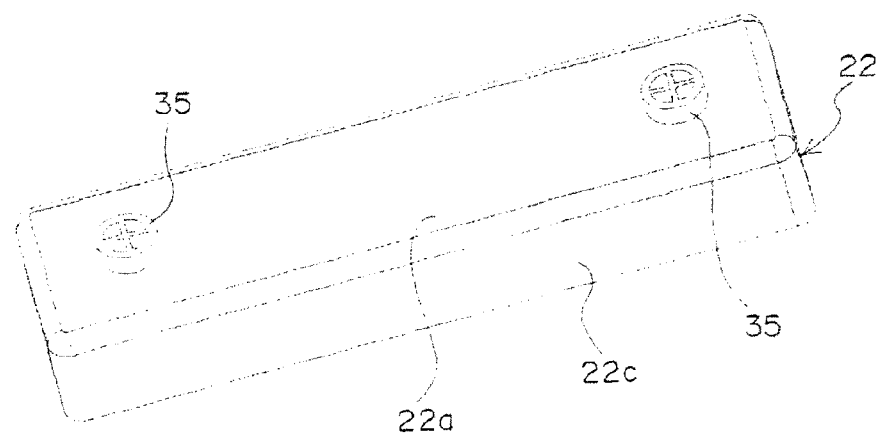
FIG. 9B is a perspective view of the lower cap, as viewed from below.

Further referring to FIGS. 5 to 7, a power generating element 4 (schematically shown in FIGS. 6 and 7) is contained inside a cell container 3 together with an electrolyte in each of the electric cells 2. An opening formed at an upper end of the cell container 3 is covered with a cover 5.

The cell container 3 in the present preferred embodiment is provided with side walls 3b to 3e extending upward from a rectangular bottom wall 3a. The side walls include a pair of long side walls 3b and 3c opposite to each other and a pair of short side walls 3d and 3e, each having a smaller area than that of each of the long side walls 3b and 3c, opposite to each other. Out of four sides of a rectangle defined by the bottom wall 3a as the cell container 3 is viewed on a plane, the long side walls 3b and 3c extend from a pair of long sides whereas the short side walls 3d and 3e extend from a pair of short sides. The cover 5 is formed into a substantially rectangular shape. The cell container 3 and the cover 5 constitute a substantially flat, rectangular package. The side walls 3b to 3e of the cell container 3 are covered with an insulating sheet, not shown.

Figure 4:
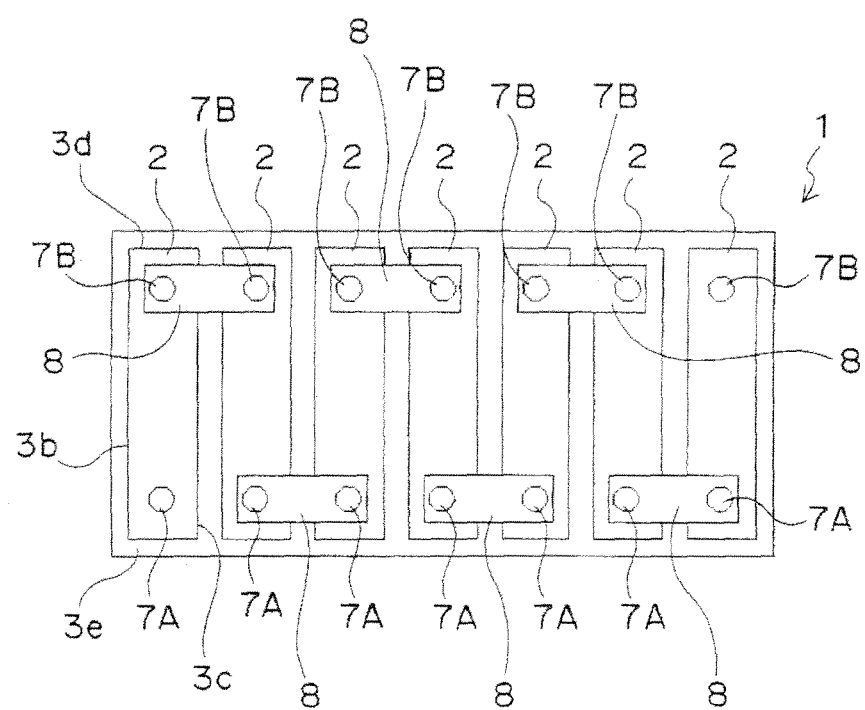
FIG. 4 is a schematic plan view of a connection path for electric cells in the battery assembly in the first preferred embodiment.

As is most clearly shown in FIG. 4, the seven electric cells 2 constituting the battery assembly 1 are aligned such that the cell containers 3 of the adjacent two electric cells 2 are parallel to each other in a longitudinal direction, as viewed from the cover 5. In other words, the seven electric cells 2 are arranged in such a manner that the long side wall 3b of one of the adjacent electric cells 2 faces the long side wall 3c of the other electric cell 2 with a clearance. A positive and a negative external terminals 7A and 7B are disposed near both ends of the cover 5 in the electric cell 2. The positive and negative external terminals 7A and 7B in each of the electric cells 2 are electrically connected to the other external terminals 7A and 7B in the other of the adjacent electric cells 2 via bus bars (i.e., conductive members) 8. In this manner, the seven electric cells 2 are connected in series to each other. In FIG. 4, the external terminal 7A of the leftmost electric cell 2 constitutes a positive electrode of the battery assembly 1 whereas the external terminal 7B of the rightmost electric cell 2 constitutes a negative electrode of the battery assembly 1.

As shown in FIGS. 5 and 6, heads, not shown, of the external terminals 7A and 7B and connecting rods 10A and 10B are contained in gaskets 9A and 9B mounted at the upper surface of the cover 5. A shaft 7a of each of the external terminals 7A and 7B, having a male screw formed thereat, projects upward from the head, and penetrates each of the connecting rods 10A and 10B. The shaft 7a of each of the external terminals 7A and 7B is inserted into a through hole 8a formed at one end of the bus bar 8, and then, is fixed to one end of the bus bar 8 via a nut 11. Each of the connecting rods 10A and 10B is connected to a current collector, not shown, inside of the cell container 3 via a rivet 12, and consequently, the current collector is connected to the power generating element 4.

A rectangular inspecting terminal 10a having a small width is disposed at one end (i.e., an end on a side opposite to each of the external terminals 7A and 7B) in each of the connecting rods 10A and 10B. As is most clearly shown in FIG. 5, the inspecting terminals 10a laterally project from the gaskets 9A and 9B, to be thus positioned above the upper surface of the cover 5 with a clearance. A screw hole 10b for screwing a screw, not shown, for connecting an electric wire is formed near the tip of the inspecting terminal 10a.

The battery assembly 1 includes a holding structure 20 for holding the seven electric cells 2 in the above-described arrangement. The holding structure 20 is provided with an upper cap (i.e., a first cap) 21 and a lower cap (i.e., a second cap) 22, which are disposed in each of the electric cells 2. The upper cap 21 and the lower cap 22 are made of a resin in the present preferred embodiment. Moreover, the holding structure 20 is provided with an upper holder (i.e., a first holder) 23 and a lower holder (i.e., a second holder) 24, which hold the electric cells 2 capped with the upper cap 21 and the lower cap 22 in a vertical direction in the drawings. In addition, the holding structure 20 is provided with a pair of side parts 25 and 26 which connect the upper holder 23 and the lower holder 24 to each other. A monitor 37 is fixed to the side part 25.

A description will be given of the upper cap 21 with reference to FIGS. 5, 6, and 8A to 8C. The two upper caps 21 are disposed at the upper end of the electric cell 2 in such a manner as to cap the pair of external terminals 7A and 7B, respectively. The upper cap 21 includes a rectangular top wall 21a, a front wall 21b (i.e., a first end wall) and a rear wall 21c (i.e., a second end wall) extending from lengthwise sides of the top wall 21a, and side walls 21d (i.e., a first side wall) and 21e (i.e., a second side wall) extending from lateral sides of the top wall 21a. A rib structure 21f is disposed at the lower surface of the top wall 21a.

The lower end of the front wall 21b and the lower end of the rib structure 21f near the rear wall 21c are placed at the upper end of the cell container 3, so that the upper cap 21 is held while being disposed in the electric cell 2. The upper cap 21 disposed in the electric cell 2 surrounds the external terminal 7A or 7B and their surroundings. Specifically, when the upper cap 21 is disposed in the electric cell 2, the top wall 21a of the upper cap 21 is positioned above the external terminal 7A or 7B, the upper gasket 9A or 9B, and the connecting rod 10A or 10B. The rear wall 21c extends along the upper end (i.e., near the cover 5) of the short side wall 3d or 3e of the cell container 3. Additionally, the side walls 21d and 21e extend along the upper ends (i.e., near the cover 5) of the pair of long side walls 3b and 3c of the cell container 3. Moreover, corners 21g and 21h defined by the rear wall 21c and the side walls 21d and 21e extend along corners defined by the short side wall 3d or 3e and the long side walls 3b and 3c in the cell container 3.

One upper projection (i.e., a first projection) 27 is formed at the upper surface (i.e., the outer surface) of the top wall 21a of the upper cap 21. The upper projection 27 in the present preferred embodiment is generally formed into a substantially flat columnar shape. In particular, the upper projection 27 in the present preferred embodiment includes a columnar portion 27a projecting from the upper surface of the top wall 21a and having a predetermined diameter, and a tapered portion 27b gradually reduced in diameter toward a foremost tip formed at the tip (i.e., the upper end) of the columnar portion 27a. Moreover, a tip surface 27c of the upper projection 27 is substantially flat.

As is most clearly shown in FIG. 6, the external terminal 7A or 7B is located immediately under the upper projection 27. An inspecting through hole 28 penetrates from the tip surface 27c of the upper projection 27 to the lower surface of the top wall 21a of the upper cap 21. That is to say, the inspecting through hole 28 reaches the external terminal 7A or 7B capped with the upper cap 21 from the outside of the upper cap 21.

Bus bar openings 29A, 29B, and 29C are formed on the rear wall 21c and the side walls 21d and 21e in the upper cap 21, respectively, in such a manner as to penetrate in a thickness direction. The bus bar openings 29A to 29C are formed such that the bus bar 8 connected to the external terminal 7A or 7B is inserted thereinto, and therefore, the bus bar 8 projects from the upper cap 21. In, for example, FIG. 5, the bus bar 8 connected at one end thereof to the external terminal 7A or 7B is inserted into the bus bar openings 29B of the upper cap 21, and then, projects from the upper cap 21 and extends toward the external terminal, not shown in FIG. 5, of the other electric cell. In the present preferred embodiment, the bus bar opening 29A is a cutout extending from the lower end of the rear wall 21c toward the top wall 21a whereas the bus bar openings 29B and 29C are cutouts extending from the lower ends of the side walls 21d and 21e toward the top wall 21a. Here, as long as the bus bar 8 can be inserted, the bus bar openings 29A to 29C may be through holes penetrating the rear wall 21c and the side walls 21d and 21e in the thickness direction.

A terminal opening 31 for allowing the inspecting terminal 10a of the connecting rod 10A or 10B to be inserted therethrough is formed on the front wall 21b of the upper cap 21 in such a manner as to penetrate in the thickness direction. Most of the connecting rod 10A or 10B is contained inside of the upper gasket 9A or 9B. Here, the inspecting terminal 10a as a part of the connecting rod 10A or 10B projects outward of the upper gasket 9 via the terminal opening 31. In the present preferred embodiment, the terminal opening 31 is a cutout extending from the lower end of the front wall 21b toward the top wall 21a. Here, as long as the inspecting terminal 10a can be inserted, the terminal opening 31 may be a through hole penetrating the front wall 21b in the thickness direction.

In order to protect the inspecting terminal 10a projecting outside of the upper cap 21 via the terminal opening 31, a protector 32 is disposed on the front wall 21b of the upper cap 21. The protector 32 in the present preferred embodiment is provided with a pair of plate-like ribs 33A and 33B extending from both sides of the terminal opening 31 on the front wall 21b toward both sides of the inspecting terminal 10a. Referring to FIG. 5, the upper end of each of the ribs 33A and 33B is located above the inspecting terminal 10a (i.e., a position apart from the cover 5 for the electric cell 2).

A description will be given of the lower cap 22 with reference to FIGS. 5, 7, 9A, and 9B. The lower cap 22 is an elongated box having an opening at the upper end thereof, and is disposed at the lower end of the cell container 3 in the electric cell 2. Particularly, the lower cap 22 is provided with a substantially rectangular bottom wall 22a and side walls 22b, 22c, 22d, end 22e extending from the four sides of the bottom wall 22a. When the lower cap 22 is attached to the lower end of the electric cell 2, the bottom wall 3a of the cell container 3 is placed on the bottom wall 22a, and further, the side walls 22b and 22c extend along the long side walls 3b and 3c of the cell container 3, respectively, whereas the side walls 22d and 22e extend along the short side walls 3d and 3e of the cell container 3, respectively.

A pair of lower projections 35 and 35 is formed at the lower surface (i.e., the outer surface) of the bottom wall 22a of the lower cap 22. In the present preferred embodiment, the lower projection 35 is a substantially flat column as a whole.

Figure 1:
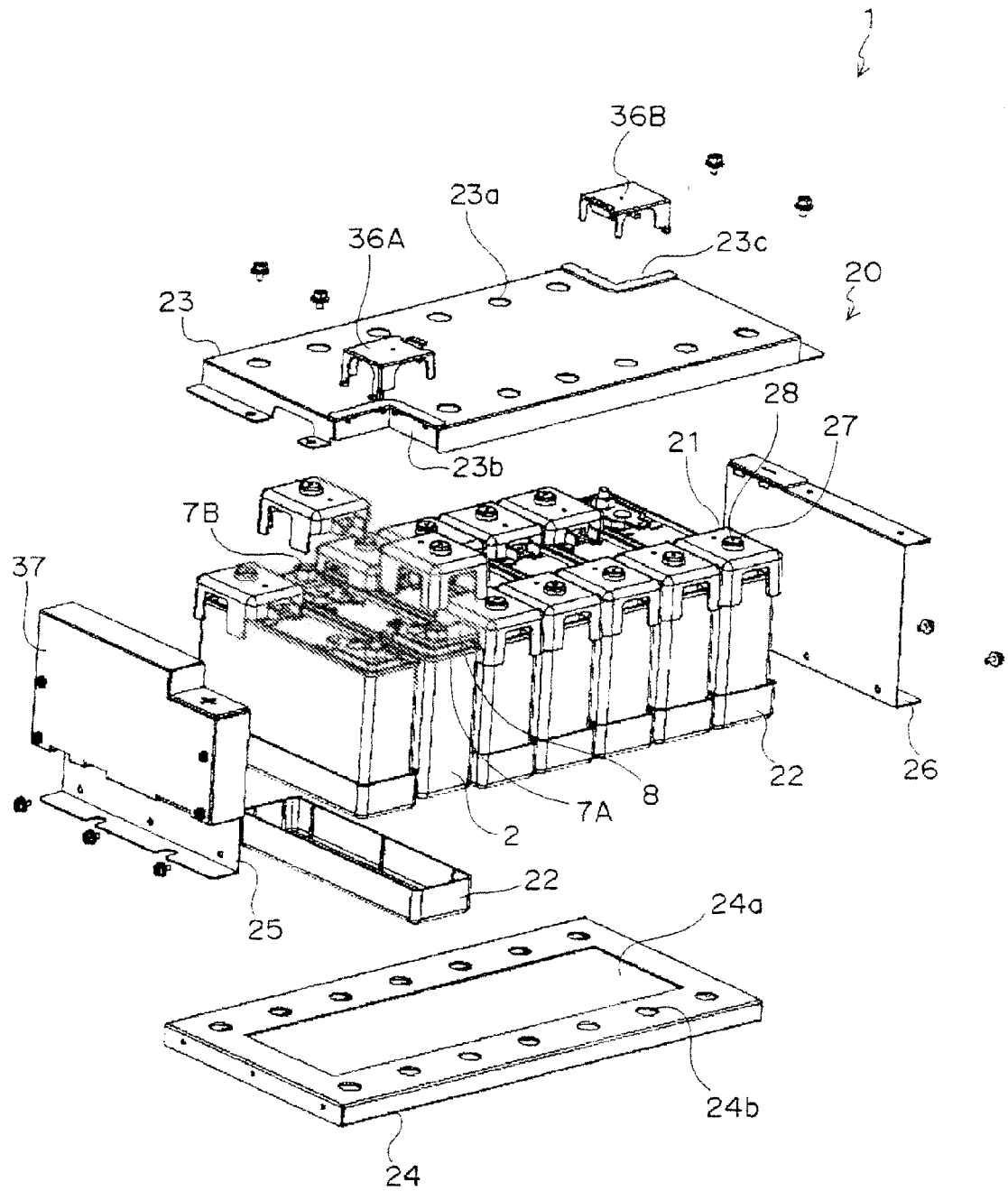
FIG. 1 is an exploded perspective view of a battery assembly in a first preferred embodiment according to the present invention.
Figure 2:
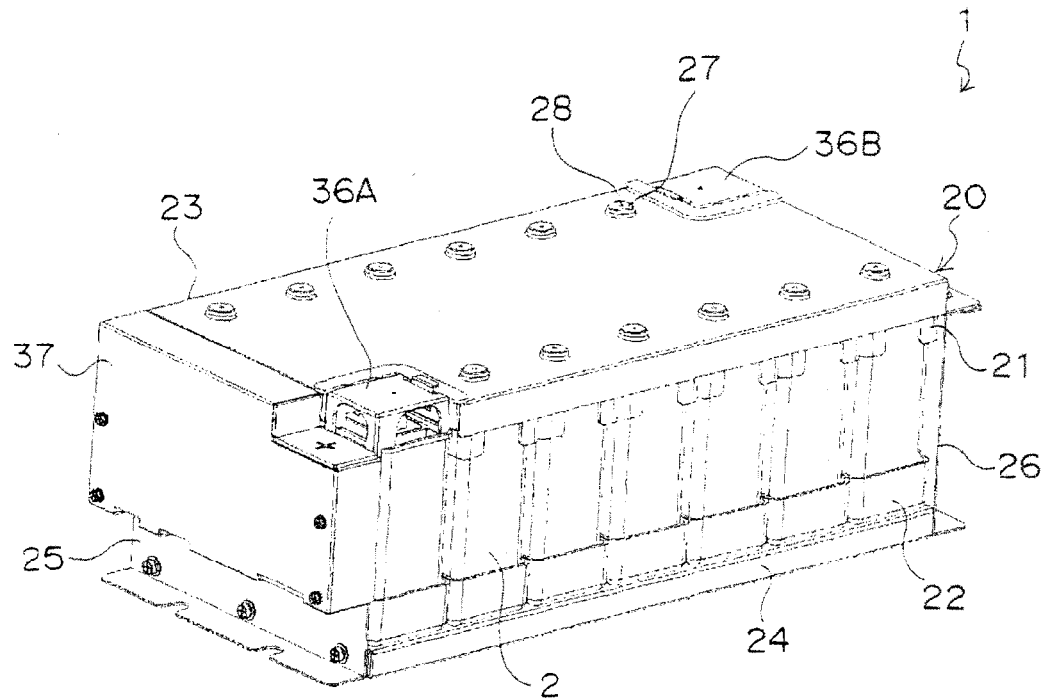
FIG. 2 is a perspective view of the battery assembly in the first preferred embodiment, as viewed from above.

The upper holder 23 in the present preferred embodiment has an integral structure obtained by pressing a metallic plate into a rectangular shape. A circular upper through hole (i.e., a first recess) 23a, to which the upper projection 27 of the upper cap 21 is fitted, is formed in such a manner as to penetrate in the thickness direction. Referring to FIGS. 1 and 2, the pair of upper caps 21 are mounted on each of the five electric cells 2 except for the rightmost and leftmost electric cells 2 in the drawings out of the seven electric cells 2. One upper cap 21 is mounted on each of the leftmost electric cell 2 in the drawings, in which the external terminal 7A functions as the positive electrode for the battery assembly 1, and the rightmost electric cell 2 in the drawings, in which the external terminal 7B functions as the negative electrode for the battery assembly 1. In other words, the battery assembly 1 includes the twelve upper caps 21 in total, and further, each of the upper caps 21 has one upper projection 27, as described above, in the present preferred embodiment. In the upper holder 23, the twelve upper through holes 23a in total are formed at the positions corresponding to the upper projections 27 of the upper cap 21.

In the upper holder 23, notched module openings 23b and 23c for exposing the external terminals 7A and 7B are formed at a corner corresponding to the external terminal 7A (i.e., the positive electrode for the battery assembly 1) of the leftmost electric cell 2 and a corner corresponding to the external terminal 7B (i.e., the negative electrode for the battery assembly 1) of the rightmost electric cell 2 in FIGS. 1 and 2. Terminal protecting covers 36A and 36B are detachably attached to the module openings 23b and 23c, respectively.

Figure 3:
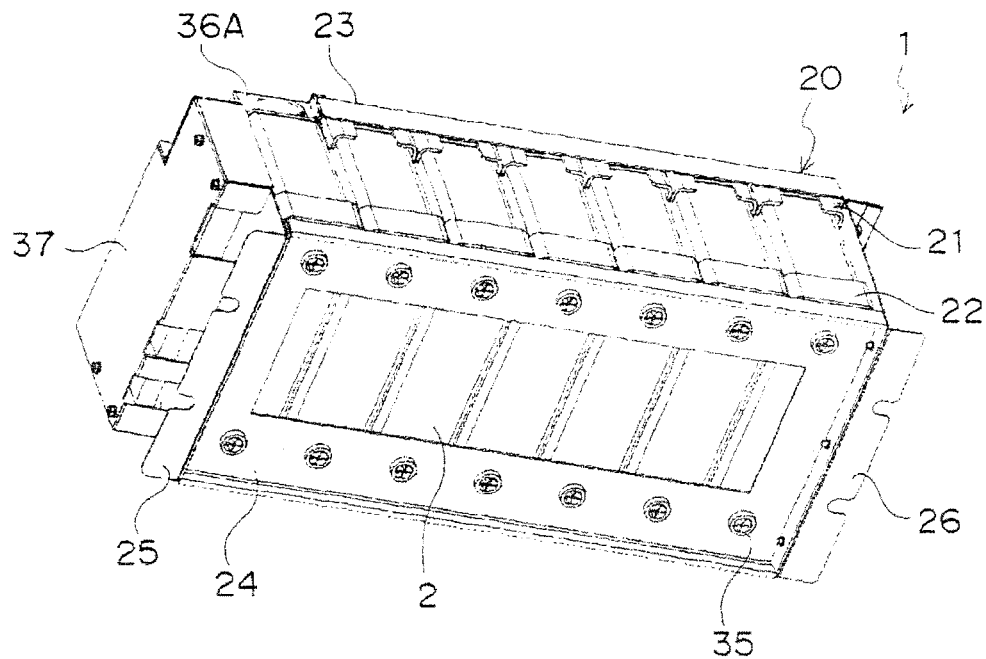
FIG. 3 is a perspective view of the battery assembly in the first preferred embodiment, as viewed from below.

The lower holder 24 in the present preferred embodiment has an integral structure obtained by pressing a metallic plate. A ventilation opening 24a having a substantially rectangular contour and a large area is formed at the center of the lower holder 24, and therefore, exhibits a rectangular frame as a whole. Circular lower through holes (i.e., second recesses) 24b to be fitted to lower projections 35 of the lower cap 22 are formed at the lower holder 24 in such a manner as to penetrate in the thickness direction. Referring to FIGS. 1 to 3, the lower caps 22 are fitted to all of the seven electric cells 2. Here, each of the lower caps 22 is provided with the two lower projections 35, as described above. Consequently, the fourteen lower through holes 24b in total are formed at positions corresponding to the lower projections 35, respectively, in the lower holder 24.

Referring to FIGS. 1 to 3, in the upper cap 21 disposed at the upper end of the electric cell 2, the upper projection 27 is fitted into the upper through hole 23a, and further, the top wall 21a abuts against the lower surface of the upper holder 23. In contrast, in the lower cap 22 disposed at the lower end of the electric cell 2, the lower projection 35 is fitted into the lower through hole 24b, and further, the bottom wall 22a abuts against the upper surface of the lower holder 24. The upper holder 23 and the lower holder 24 are joined to each other via the side parts 25 and 26 while holding the seven electric cells 2 therebetween via the upper caps 21 and the lower caps 22. The side part 25, to which the monitor 37 is attached, is disposed adjacently to the leftmost electric cell 2 in the drawings whereas the other side part 26 is disposed adjacently to the rightmost electric cell 2 in the drawings. Each of the side parts 25 and 26 in the present preferred embodiment has an integral structure obtained by pressing a metallic plate into a rectangular shape. In the present preferred embodiment, the upper and lower ends of the side parts 25 and 26 are connected to the upper holder 23 and the lower holder 24 via screws, respectively.

The upper holder 23 and the lower holder 24 may be constituted of a plurality of members as long as they can securely hold the electric cells 2 therebetween via the upper caps 21 and the lower caps 22. In the same manner, the side parts 25 and 26 also may be constituted of plurality of members as long as the upper holder 23 and the lower holder 24 can securely hold the electric cells 2 therebetween, and therefore, they may be connected to the upper holder 23 and the lower holder 24 via means other than screwing. Moreover, one or both of the side parts 25 and 26 may have a structure integral with the upper holder 23 or the lower holder 24. In summary, the specific configuration of each of the upper holder 23, the lower holder 24, and the side portions 25 and 26 is not specially limited as long as the electric cells 2 can be securely held therebetween via the upper caps 21 and the lower caps 22.

Figure 11:
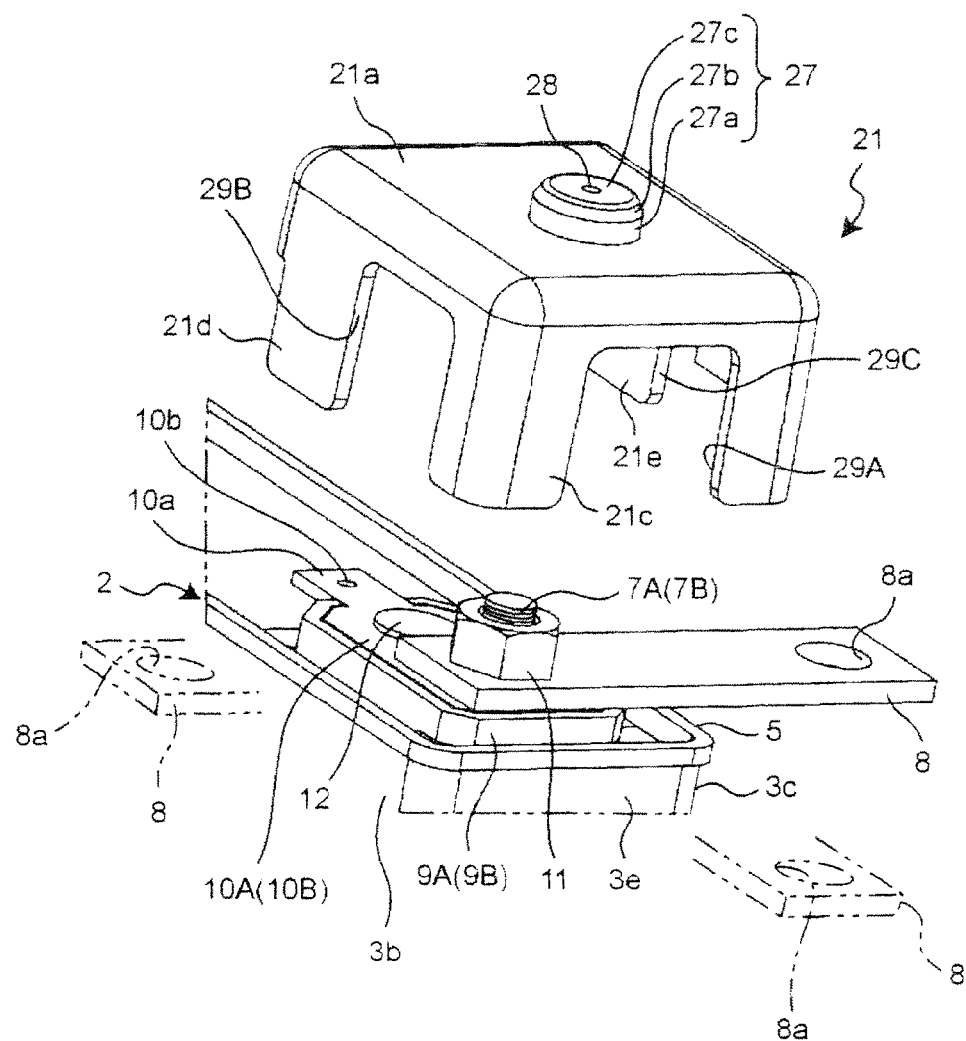
FIG. 11 is an exploded perspective view of the electric cell and the upper cap.

In FIGS. 10 and 11, the bus bar 8 connected at one end thereof to the external terminal 7A projects outward from the upper cap 21 through the bus bar opening 29C formed on the side wall 29e out of the three bus bar openings 29A to 29C in the upper cap 21. The bus bar 8 inserted into the bus bar opening 29C projects on the side of the long side wall 3b of the cell container 3 for the electric cell 2. However, the orientation of the bus bar 8 can be easily varied according to one of the three bus bar openings 29A to 29C, into which the bus bar 8 is inserted. In particular, when the bus bar 8 connected at one end thereof to the external terminal 7A projects from the long side wall 3c of the cell container 3, the bus bar 8 is merely inserted into the bus bar opening 29B formed on the side wall 21d of the upper cap 21, as indicated by a chain double-dashed line. In contrast, when the bus bar 8 connected at one end thereof to the external terminal 7B projects from the short side wall 3e of the cell container 3, the bus bar 8 is merely inserted into the bus bar opening 29A formed on the side wall 21c of the upper cap 21. In this manner, in the present preferred embodiment, the plurality of bus bar openings 29A to 29C are formed in the upper cap 21, so that the projection orientation of the bus bar 8 connected at one end thereof to the external terminal 7A or 7B can be easily varied. In other words, the plurality of openings are formed on the walls of the cap surrounding the external terminal. Thus, the conductive member such as a bus bar can extend from the external terminal in the various directions, thereby achieving the high degree of freedom of the arrangement of the electric cells.

Each of the electric cells 2 constituting the battery assembly 1 is provided with the pair of external terminals 7A and 7B. As is most clearly shown in FIGS. 4 and 5, in the present preferred embodiment, the bus bar 8 connected to one external terminal 7A for each of the electric cells 2 projects from one long side wall 3c whereas the bus bar 8 connected to the other external terminal 7B projects from the other long side wall 3b. That is to say, the two bus bars 8 connected to each of the electric cells 2 project oppositely to each other. However, the orientations in which the three bus bar openings 29A to 29C are opened in the upper cap 21 are shifted at substantially 90° on the external terminal 7A or 7B, as viewed in the direction in which the external terminals 7A and 7B project. The two bus bar openings 29A and 29B out of the bus bar openings 29A to 29C shifted at substantially 90° are disposed on the pair of side walls 21d and 21e in the upper cap 21 extending along the long side walls 3b and 3c of the cell container 3. Consequently, it is unnecessary to prepare different upper caps for the external terminals 7A and 7B. The orientation of the bus bar 8 can be varied merely by determining which of the bus bar openings 29B and 29C the bus bar 8 is inserted into, so that the same upper cap 21 can be used for both of the external terminals 7A and 7B.

Second Preferred Embodiment

Figure 16:
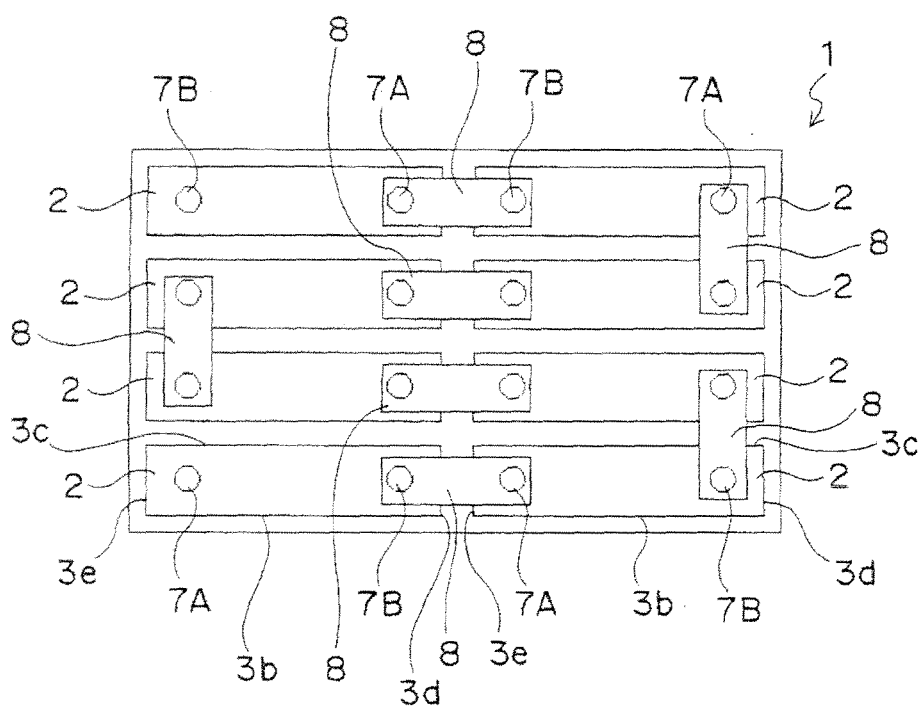
FIG. 16 is a schematic plan view of a connection path for electric cells in the battery assembly in the second preferred embodiment.

FIGS. 13 to 16 show a battery assembly 1 in a second preferred embodiment according to the present invention. The battery assembly 1 includes eight electric cells 2 of the same square type as those in the first preferred embodiment. Specifically, the four electric cells 2 are arranged in two rows. As shown in FIG. 16, external terminals 7A and 7B disposed in each of the electric cells 2 from the electric cell 2 at a lower left corner to the electric cell 2 at an upper left corner are connected to external terminals 7A and 7B of the adjacent electric cell 2 in the same or different rows via bus bars 8, so that the eight electric cells 2 are connected in series.

As is most clearly shown in FIG. 4, the bus bars 8 connected to the external terminals 7A and 7B of the electric cells 2 project from the long side walls 3b and 3c of the cell container 3 in the first preferred embodiment. In contrast, as is most clearly shown in FIG. 16, in the second preferred embodiment, one of the bus bars 8 connected to the external terminals 7A and 7B projects from the long side wall 3b or 3c whereas the other bus bar 8 projects from the short side wall 3d or 3e. For example, in FIG. 16, the bus bar 8 connected to the external terminal 7B in the electric cell 2 on a lower right corner projects from the long side wall 3c in the same manner as in the first preferred embodiment whereas the bus bar 8 connected to the external terminal 7A projects from the short side wall 3e. In this manner, the arrangement of the electric cells 2 is varied from that in the first preferred embodiment such that some of the bus bars 8 project not from the long side walls 3b and 3c but from the short side walls 3d and 3e in the second preferred embodiment. However, as is obvious also from FIGS. 10 and 11 in addition to FIG. 16, the bus bar 8 whose orientation is varied in such a manner as to project from the short side wall 3d or 3e can project outward from an upper cap 21 merely by inserting the bus bar into a bus bar opening 29A formed on a rear wall 21c of the upper cap 21. In this manner, the same upper cap 21 as that in the first preferred embodiment can be used in the battery assembly 1 in the second preferred embodiment. In other words, although the orientation of the bus bar 8 is varied from that in the first preferred embodiment, there is no need to redesign a different upper cap from that in the first preferred embodiment in the second preferred embodiment.

The other configuration and operation in the second preferred embodiment are identical to those in the first preferred embodiment. Thus, the same constituent elements are designated by the same reference numerals as those in the first preferred embodiment, and therefore, their explanation will not be given.

As described above with respect to the first and second preferred embodiments, three bus bar openings 29A to 29C in total are formed on a rear wall 21c and side walls 21d and 21e of the upper cap 21 covering the external terminal 7A or 7B, so that the orientation of bus bars 8 for connecting the external terminals 7A and 7B to the external terminals 7A and 7B of adjacent other electric cells 2 can be varied by determining which of the bus bar openings 29A to 29C the bus bars 8 are inserted into. In other words, as for one upper cap 21, the bus bar 8 can extend from the external terminals 7A and 7B in three directions. Consequently, it is unnecessary to prepare a plurality of kinds of upper caps according to the orientations of the bus bars 8 extending from the external terminals 7A and 7B. Even when the orientations of the bus bars 8 are varied according to the change of the arrangement of the electric cells 8 constituting the battery assembly 1, there is no need to redesign the upper cap. In these points, the present invention can achieve the high degree of freedom of the arrangement of the electric cells 2.

Figure 12:
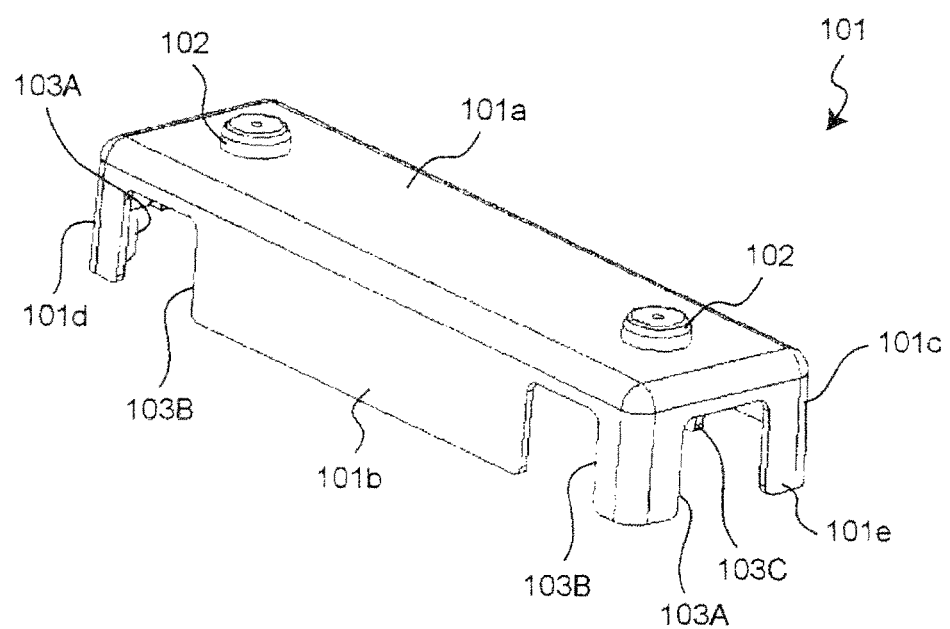
FIG. 12 is a perspective view of the upper cap in a modification.
Figure 13:
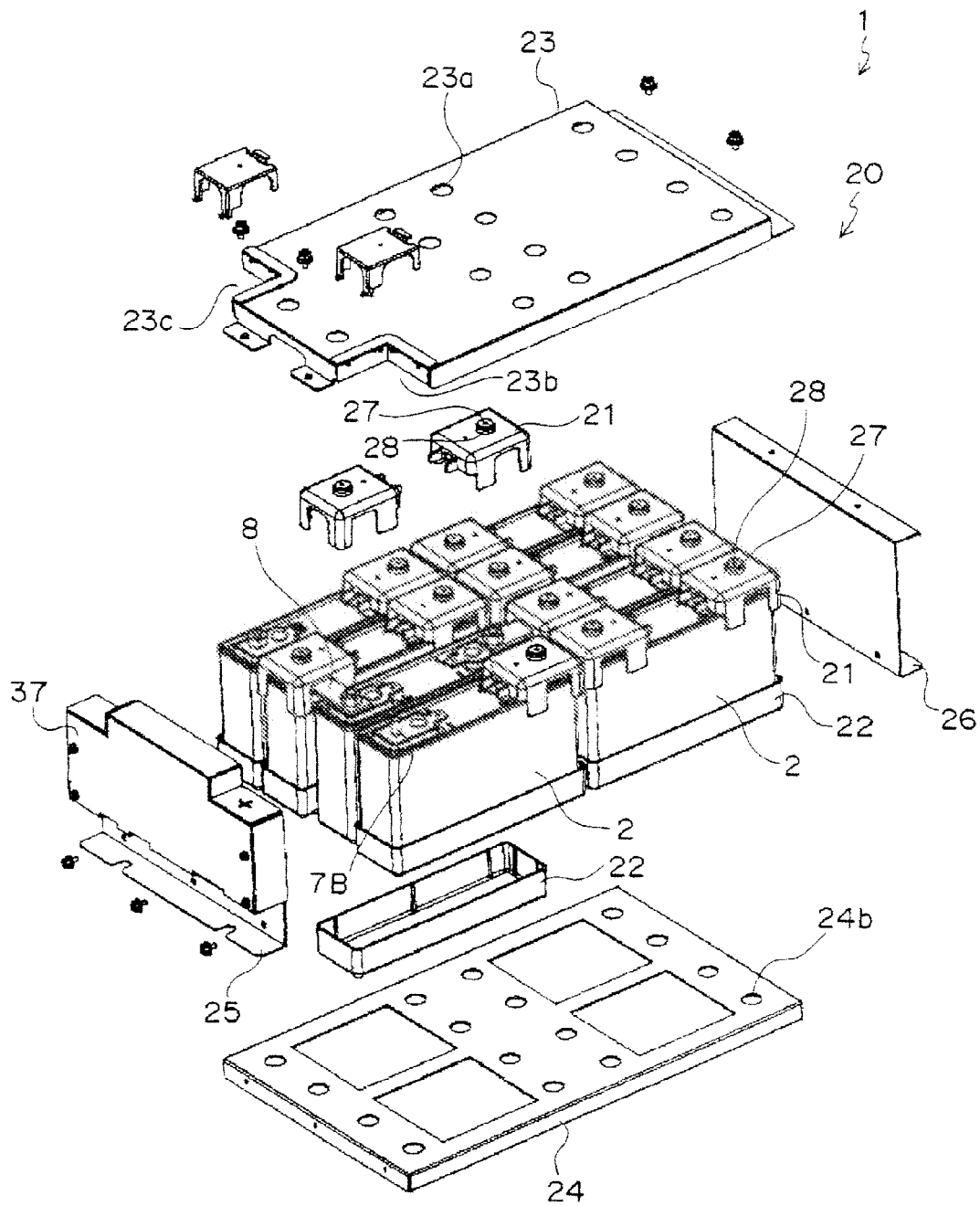
FIG. 13 is an exploded perspective view of a battery assembly in a second preferred embodiment according to the present invention.
Figure 14:
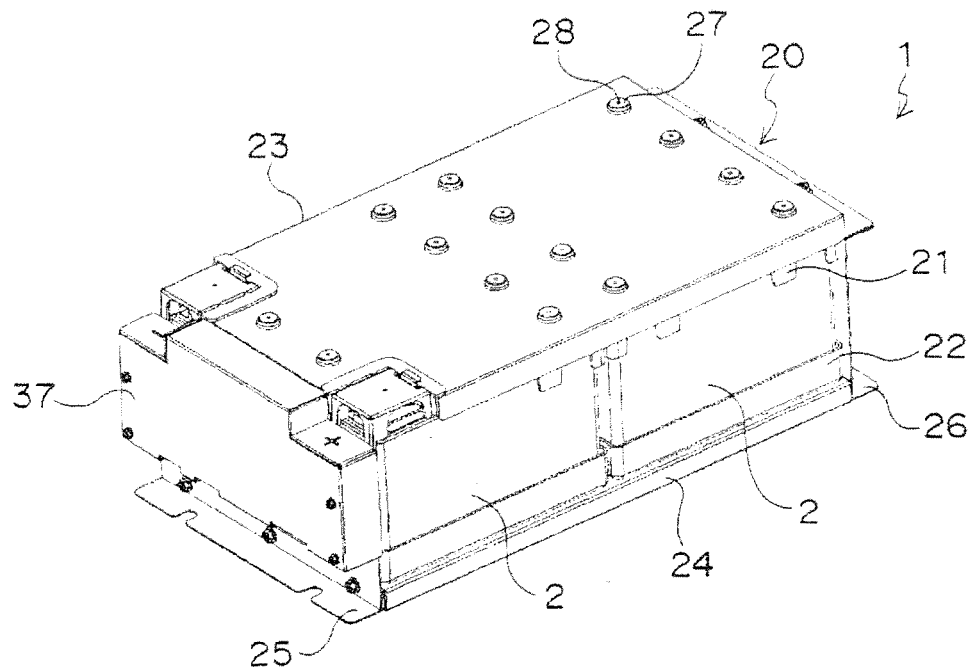
FIG. 14 is a perspective view of the battery assembly in the second preferred embodiment, as viewed from above.
Figure 15:
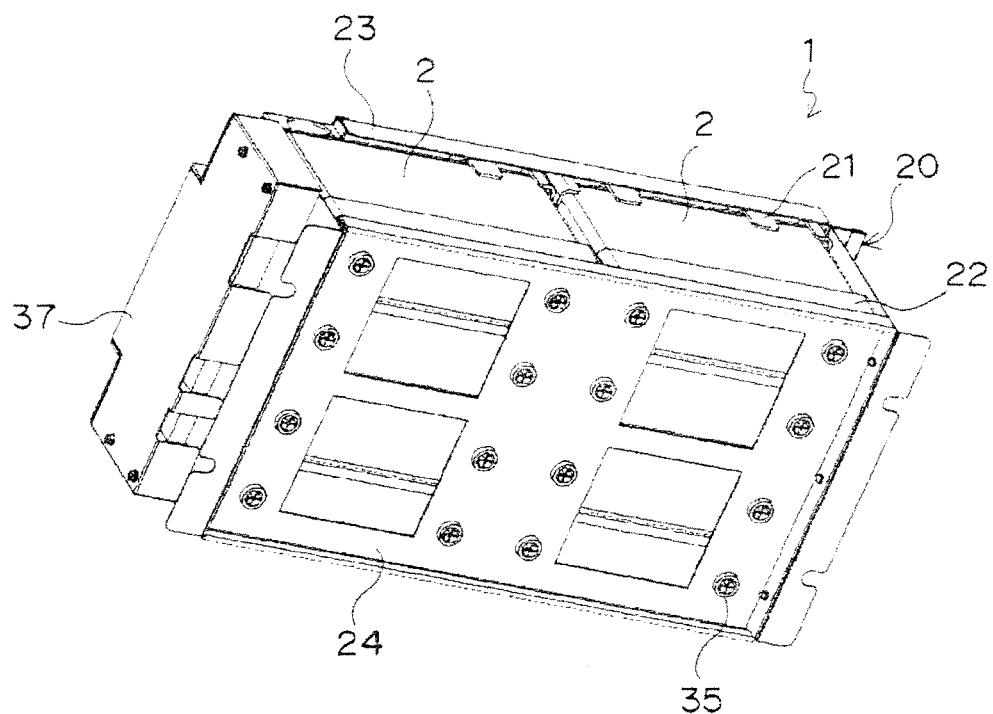
FIG. 15 is a perspective view of the battery assembly in the second preferred embodiment, as viewed from below.

FIG. 12 shows an upper cap 101 in a modification. The upper cap 101 is constituted by integrating the two upper caps 21 and 21 (corresponding to the external terminals 7A and 7B, respectively) capping the electric cells 2.

The upper cap 101 includes a rectangular top wall 101a having a pair of upper projections 102 to be fitted to upper through holes 23a formed in an upper holder 23, a pair of side walls 101b and 101c extending from long sides of the top wall 101a, and a pair of end walls 101d and 101e extending from short sides of the top wall 101a. Three bus bar openings 103A, 103B, and 103C are formed in the vicinity of each of both ends of the upper cap 101. One bus bar opening 103A out of the three bus bar openings 103A to 103C is formed on each of the end walls 101d and 101e whereas the residual bus bar openings 103B and 103C are formed on the side walls 101b and 101c, respectively. The upper cap 101 has the three bus bar openings 103A to 1030 in each of the external terminals 7A and 7B, and therefore, it can cope with the variation of the orientation of the bus bar 8 only by determining which of the bus bar openings 103A to 103C the bus bar 8 is inserted into.

The number of bus bar openings for each of the external terminals 7A and 7B in each of the upper caps 21 and 101 is set to three. However, the number of bus bar openings for each of the external terminals 7A and 7B may be set to two or four or more.

What is claimed is:

1. A battery assembly comprising:
    a plurality of electric cells, an electric cell of the plurality of electric cells including a plurality of external terminals formed at an end of the electric cell;
    an insulating cap disposed at the end of the electric cell, the insulating cap including walls surrounding an external terminal of the plurality of external terminals; and
    a plurality of openings penetrating the walls in a thickness direction,
    wherein the insulating cap includes a top wall formed into a substantially rectangular shape, as viewed on a plane, in parallel to a top surface of the electric cell, a first end wall extending from the top wall along a first end surface of the electric cell, a second end wall extending toward the top surface of the electric cell, and first and second side walls extending along first and second side surfaces of the electric cell, respectively, and
    wherein the openings in the insulating cap are formed on the first end wall and the first and second side walls.

2. A battery assembly according to claim 1, further comprising a conductive member including an end connected to the external terminal for the electric cell, and an other end connected to an other electric cell of the plurality of electric cells,
    wherein the conductive member is inserted into an opening of the plurality of openings.

3. A battery assembly according to claim 1, wherein the plurality of openings are opened in directions different from each other.

4. A battery assembly according to claim 3, wherein the plurality of openings are spaced at 90°, as viewed from the external terminal.

5. A battery assembly according to claim 1, wherein the electric cell is formed into a substantially rectangular shape, the top surface is formed into a rectangular shape, as viewed on a plane, having long sides and short sides, the electric cell further includes a second end surface, the first and second end surfaces extending from both ends of the long sides of the top surface in a substantially orthogonal direction, and the first and second side surfaces extend from both ends of the short sides of the top surface in a substantially orthogonal direction.

6. A battery assembly according to claim 1, further comprising a holder that is disposed at one of the ends of each of the plurality of electric cells and abuts against the insulating cap.

7. An electric cell comprising:
    a package;
    a plurality of external terminals disposed at an end of the package; and
    an insulating cap disposed at the end, the insulating cap including walls surrounding an external terminal of the plurality of external terminals; and
    a plurality of openings penetrating the walls in a thickness direction,
    wherein the insulating cap includes a top wall formed into a substantially rectangular shape, as viewed on a plane, in parallel to a top surface of the electric cell, a first end wall extending from the top wall along a first end surface of the electric cell, a second end wall extending toward the top surface of the electric cell, and first and second side walls extending along first and second side surfaces of the electric cell, respectively, and
    wherein the openings in the insulating cap are formed on the first end wall and the first and second side walls.

8. An electric cell according to claim 7, further comprising a conductive member including an end connected to the external terminal, and an other end extending outward of the insulating cap via an opening of the plurality of openings.

9. An electric cell according to claim 7, wherein the plurality of openings are opened in different directions from each other.

10. An electric cell according to claim 9, wherein the plurality of openings are spaced at 90°, as viewed from the external terminal.

11. An electric cell according to claim 7, wherein the electric cell is formed into a substantially rectangular shape, the top surface is formed into a rectangular shape, as viewed on a plane, having long sides and short sides, the electric cell further includes a second end surface, the first and second end surfaces extending from both ends of the long sides of the top surface in a substantially orthogonal direction, and the first and second side surfaces extend from both ends of the short sides of the top surface in a substantially orthogonal direction.

12. An electric cell according to claim 7, wherein the insulating cap comprises a plurality of insulating caps, the plurality of insulating caps including an other insulating cap which includes walls surrounding an other external terminal of the plurality of external terminals.

13. An electric cell according to claim 8, wherein the insulating cap comprises a plurality of insulating caps, the plurality of insulating caps including an other insulating cap which includes walls surrounding an other external terminal of the plurality of external terminals, and a plurality of openings penetrates the walls of the other insulating cap in a thickness direction, wherein the electric cell further comprises:
an other conductive member including an end connected to the other external terminal, and an other end extending outward of the other insulating cap via an opening of the plurality of openings, and
wherein the other end of the conductive member extends outward of the insulating cap in a first direction, and the other end of the other conductive member extends outward of the other insulating cap in a second direction which is different from the first direction.

14. An insulating cap for an end of a package for an electric cell including an end provided with an external terminal, the insulating cap comprising:
a plurality of walls for surrounding the external terminal, the plurality of walls comprising an electrically insulating material and comprising:
a rear wall;
a first side wall connected to the rear wall; and
a second side wall connected to the rear wall and formed opposite the first side wall; and
a plurality of openings penetrating the rear wall, the first side wall and the second side wall in a thickness direction.

15. The insulating cap of claim 14, wherein the plurality of walls further comprises a top wall which is connected to the rear wall and the first and second side walls, and includes a projecting portion which projects in a direction away from the rear wall and first and second side walls.

16. The insulating cap of claim 15, wherein the projecting portion comprises a columnar shape for accommodating the external terminal.

17. The insulating cap of claim 15, wherein the plurality of openings comprises a first cutout extending from a lower end of the rear wall toward the top wall, a second cutout extending from a lower end of the first side wall toward the top wall, and a third cutout extending from a lower end of the second side wall toward the top wall.

18. The insulating cap of claim 15, wherein the plurality of walls further comprises a front wall which is formed opposite the rear wall and is connected to the top wall and the first and second side walls, the front wall comprising:
a terminal opening comprising a cutout extending from a lower end of the front wall toward the top wall; and
a protector comprising a pair of plate-shaped ribs extending from the front wall on opposing sides of the terminal opening, and in a direction away from the rear wall.

19. The battery assembly according to claim 1, wherein the insulating cap comprises a plurality of insulating caps, the plurality of insulating caps including an other insulating cap which includes walls surrounding an other external terminal of the plurality of external terminals, and the insulating cap and the other insulating cap comprise a substantially identical structure.

20. The battery assembly according to claim 1, wherein the plurality of external terminals includes another external terminal formed at the end of the electric cell, and the walls of the insulating cap surround the other external terminal of the plurality of external terminals.

* * * * *